United States Patent [19]

Scammon, Jr. et al.

[11] 3,811,907

[45] May 21, 1974

[54] PROCESSING OF SILICATE ORES AND PRODUCT THEREOF

[75] Inventors: Lawrence W. Scammon, Jr., Concord; Clarence L. Grant, Durham; Phillip H. Wilks, Manchester, all of N.H.

[73] Assignee: Humphreys Corporation, Bow, N.H.

[22] Filed: Mar. 12, 1973

[21] Appl. No.: 340,451

Related U.S. Application Data

[62] Division of Ser. No. 168,687, Aug. 3, 1971, Pat. No. 3,749,763.

[52] U.S. Cl. ............ 106/299, 106/308 AB, 423/608
[51] Int. Cl. ............................................. C09c 1/62
[58] Field of Search .......... 106/299, 308 B; 423/608

[56] References Cited
UNITED STATES PATENTS

| | | | |
|---|---|---|---|
| 3,389,005 | 6/1968 | Kloepfer et al. | 106/299 |
| 2,981,594 | 4/1961 | Burker et al. | 423/84 |
| 2,696,425 | 12/1954 | Kistler | 186/299 |

*Primary Examiner*—Delbert E. Gantz
*Assistant Examiner*—J. V. Howard

[57] ABSTRACT

Separating silica from a metal silicate ore such as zircon by heating particles of the ore above the dissociation temperature of the ore without coalescence of the particles, and quenching the heated particles immediately so that the particle temperature decreases from above to below the dissociation temperature in less than 0.1 seconds. Dissociated zircon particles produced by this process have extremely small zirconia crystallites having dimensions less than about 0.2 microns in fused amorphous silica. Zirconia is produced from these dissociated zircon particles by leaching in an aqueous alkali medium.

9 Claims, 4 Drawing Figures

PATENTED MAY 21 1974                                    3,811,907

PROCESSING OF SILICATE ORES AND PRODUCT THEREOF

This application is a division of Ser. No. 168,687, filed Aug. 3, 1971, now U.S. Pat. No. 3,749,763, entitled "Processing of Silicate Ores and Product Thereof."

This invention relates to the processing of silicate ores, and particularly to the separation and recovery of zirconia from zircon.

Metal silicates of which the metal oxide is insoluble in silica and does not decompose at molten silica temperatures dissociate at elevated temperatures to form a slush of metal oxide particles in silica. For example, zircon, $ZrSiO_4$, has been reported to dissociate when heated to about 1,775°C into a zirconia-rich phase and a silica-rich phase.

Following dissociation with separation of the metal oxide from the silica would appear to present a process for recovering metal oxides from silicate ores. However, the silica has not generally heretofore been reduced to a state where it can be readily removed.

Although, for example, use of contaminants has been suggested to improve the leachability of dissociated zircon (U.S. Pat. No. 2,696,425), the zirconia produced is not sufficiently small to be of use, e.g., in producing colored ceramic materials where zirconia, silica, and a colorant are mixed and fused to a colored zircon ceramic material. The smaller the starting zirconia particles, the better and more uniform will be the colorant dispersion through the mixture. Grinding of the zirconia particles is unsatisfactory since not only does grinding inevitably introduce impurities into the zirconia, but it is insufficient to achieve the desired fine size for the particles.

The leaching difficulty of prior dissociated zircon has also increased the complexity of investment casting and similar casting processes in which zircon or zircon and silica mixtures are used to form molds. Removal of the mold from the article formed in it by leaching has been accomplished only by using molten alkali salts, a procedure which requires expensive non-corrodible equipment and, because of the extremely caustic nature of the leachment, remote handling.

It is an object of this invention to provide a novel method for recovering metal oxides from silicate ores.

Another object is to provide a novel dissociated zircon of improved leachability as well as improved phase separation between the zirconia and silica phases.

Another object is to provide a novel process and apparatus for the production of substantially pure zirconia from ziron.

Another object is to provide improved zirconia-containing ceramic materials, which are improved, e.g., in ease of molding, ease of removal from molded articles, density, and uniformity of color and composition.

A further object is to provide a novel process and apparatus for treating naturally occurring zircon ore to render it of greater commercial utility, both as a dissociated zircon and as a source of substantially pure zirconia.

The invention features a process for separating silica from a metal silicate ore of the type which dissociates into silica and a metal oxide at an elevated dissociation temperature comprising the steps of providing particles of the ore having maximum dimensions less than 1,000 microns, injecting a stream of the particulate silicate ore at a positive injection velocity through a zone of intense heat sufficient to raise the temperature of the particles throughout above the dissociation temperature of the ore without substantial coalescence of the particles, quenching the heated particles immediately on exiting the zone from a temperature above the dissociation temperature to a temperature beneath the dissociation temperature in less than 0.1 second, and collecting the resultant dissociated particles. Preferably, the total elapsed time during which particles are above the dissociation temperature is not longer than about 0.2 seconds.

The heating to above 1,775°C and rapid quenching of zircon ore in accordance with this process produces dissociated zircon comprising monoclinic zirconia containing less than 1 percent by weight silica and fused amorphous silica. The monoclinic zirconia is in the form of extremely small crystallites, of which 95 percent have dimensions less than about 0.5 microns and preferably even less than about 0.2 microns. For best results, a particulate zircon ore in which at least about 90 percent of the particles have maximum dimensions of about 100 to 250 microns is a preferred starting material.

The dissociated zircon so produced can be leached in an aqueous alkali medium to remove some or substantially all of the silica, to leave porous particles which, with only 10 percent or less silica by weight remaining (whereas the dissociated zircon generally contains about 30 to 35 percent silica by weight), are quite friable. Particles containing less than 1 percent by weight, and even less than 0.5 percent by weight can be produced, and readily crushed to provide zirconia, in the form of tiny separated crystallites having maximum dimensions of 0.2 microns.

These fine zirconia particles are particularly useful for mixing with silica and a colorant to make colored ceramic materials, as well as, because of the high purity of these zirconia in these particles, as a starting material for making other zirconium compounds. The particles retain their porosity even when crushed to 325 mesh, and hence are not only chemically very reactive but also, when used to form ceramic materials, form products of lighter weight.

The dissociated zircon particles, because of the easy leachability of the silica phase, are also quite useful in investment casting, since the mold formed of the dissociated zircon particles may be readily leached to an easily fractured friable zirconia mass.

In a preferred leaching procedure, the dissociated zircon is leached in aqueous alkali metal hydroxide solution maintained at an elevated temperature at or beneath its boiling point and at atmospheric pressure and which contains at least the stoichiometric amount of alkali metal hydroxide needed to convert all of the silica in the dissociated zircon to the corresponding alkali metal silicate. A preferred leaching medium is a 10 to 60 percent by weight aqueous sodium hydroxide solution maintained at a temperature of about 250° to 290°F, and containing about 1.5 to 2.5 times the required stoichiometric amount of sodium hydroxide. In a preferred leaching process, at least two leaches are carried out, of which the first is with partially spent sodium hydroxide, and the second and subsequent are with fresh sodium hydroxide; the second and subsequent leaches then serve to provide partially spent sodium hydroxide for processing additional dissociated material.

According to a preferred embodiment, the zone of intense heat is provided by disposing a plurality of anode electrodes so that their respective end surfaces define a passage having an axis perpendicular to those end surfaces, positioning a cathode electrode structure so that its effective end surface is on the axis, and energizing the anode and cathode electrodes at a current density sufficient to produce a spacially stable cathode jet that extends through the passage and a tail flame that extends along the axis away from the cathode jet as an extension thereof. The ore particles are introduced toward a point on the axis between the anode and cathode electrodes for flow through the passage so that the cathode jet and the tail flame heat the particles throughout to their dissociation temperature.

The ore particles are introduced to this zone in a carrier gas (preferably nitrogen is suitable for zircon ore) to impart the positive velocity thereto. For processing zircon, the current density and mass flow rate are preferably chosen to provide a power level between the electrodes of 0.6 to 1.0 kWhr per pound of zircon ore processed, and zircon is introduced to the heating zone by flow passages arranged around the cathode which are at an angle less than 30° (preferably, 23° or less) to the passage axis.

Other objects, features and advantages will appear to one skilled in the art from the following description of a preferred embodiment of the invention, taken together with the attached drawings thereof, in which.

DESCRIPTION OF PARTICULAR EMBODIMENTS

Figure 1:
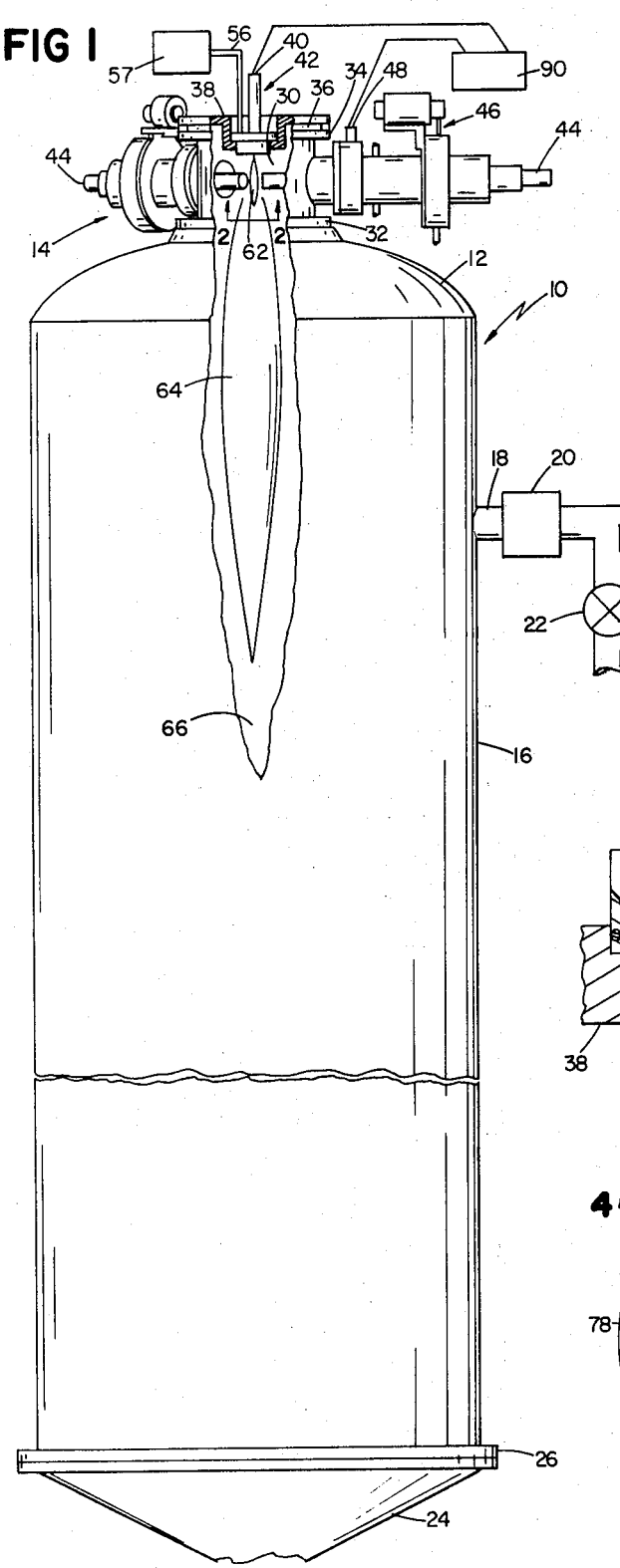
FIG. 1 is a diagrammatic elevational view, in partial section, of apparatus for practicing the invention.

With reference to FIG. 1, apparatus for practicing the invention includes a main chamber 10 having an inner wall constructed of a corrosion resistant material such as stainless steel and a spaced outer wall of mild steel. The chamber includes a domed upper wall 12 having a central opening therein in which an arc head assembly 14 is mounted; cylindrical main section 16 is 5 feet in diameter and 20 feet long. An exhaust passage 18 has a heat exchanger 20 mounted on it and a check valve 22 downstream from exchanger 20, thus enabling system operation at a pressure slightly greater than atmospheric. The collection chamber 24 at the base of main section 16 is secured by flange 26 to the cylindrical section 16. Cooling water is circulated through the sections 12, 16 and 24 of the chamber assembly 10 and baffles between the stainless steel inner walls and the mild steel outer walls direct the circulation of that cooling water.

The arc head assembly includes a cylindrical housing 30 of 16 inches inner diameter which has a lower flange 32 mounted on a mating surface of domed section 12 of chamber 10 and an upper flange 34 on which is secured a glass epoxy insulator disc 36 and plate 38 which carries a cathode electrode assembly 40 and material feed assembly 42. Extending radially outward from housing 30 are three anode assemblies, each of which includes a carbon electrode 44, an electrode drive assembly 46 and an electrical connection assembly 48. The tops of the anodes 44 are located in a plane about 1½ inch below the tip of the cathode 40 and the end of each anode is spaced about 1 inch from the axis of the furnace thus defining a passage approximately 2 inches in diameter. Particulate zircon to be heat-treated is injected so that the zircon particles have a trajectory that crosses the furnace axis approximately at the top of the anodes.

Figure 2:
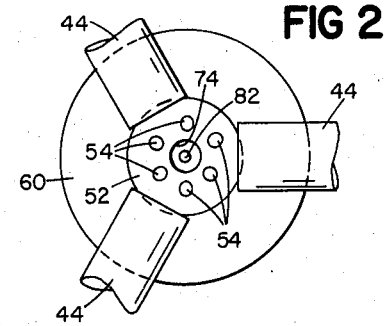
FIG. 2 is a sectional view of the arc head assembly taken along line 2—2 of FIG. 1.
Figure 4:
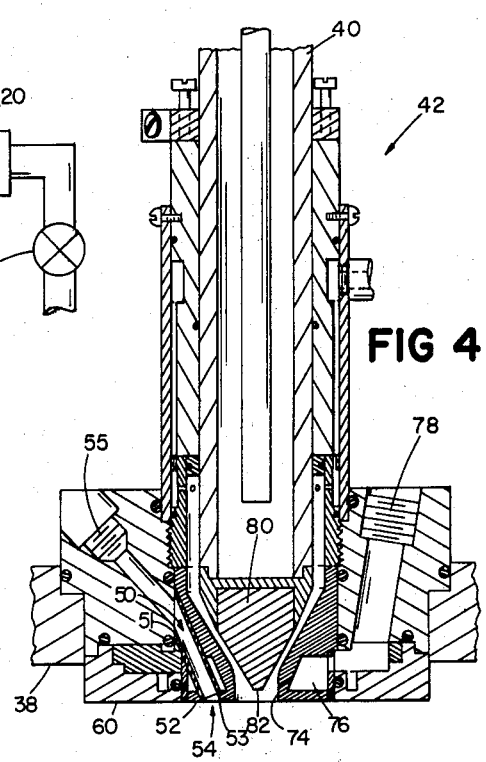
FIG. 4 is a sectional view of the material feed assembly, taken along line 4—4 of FIG. 3, with the cathode assembly inserted and also shown in section.
Figure 3:
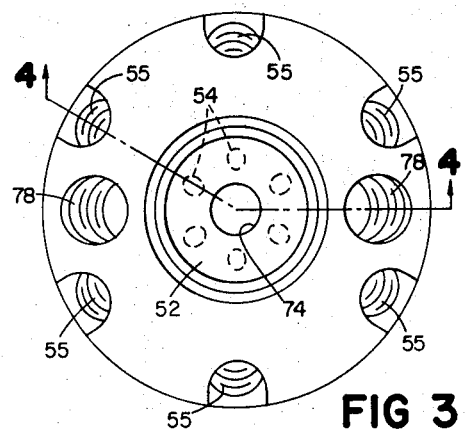
FIG. 3 is a top view of the material feed assembly of the apparatus.

Six material feed passages 50 are formed of copper tubing 51, silver soldered into appropriate bores in nozzle isrt 52, and each terminating at counterbore sections 53, which define exit ports 54. Each passage 50 is disposed at an angle of 23° to the vertical, and the centers of exit ports 54 (FIG. 2) are each located about one-half inch from the furnace axis. Each passage is connected via upper passages 55 (disposed at 37 ½ to the vertical) and feed tube 56 to powder feeder 57. The angle of injection of the axes of passages 50 is such that extensions of the passage axes intersect each other and the axis of the cathode 40 above the plane of the top surfaces of the anodes 44 at a point about 1 ¼ inch down from the lower edge of nozzle insert 52. The nozzle insert 52 provides a taper from the main bore of plate 60 (1 ⅝ inch in diameter) to an axis diameter of one-half inch at nozzle exit 74. Cooling chamber 76 in nozzle insert 52 is supplied with coolant through passages 78.

The cathode electrode 40 is water cooled and includes a conical tungsten nose 80 that tapers to flat tip 82, one-eighth inch in diameter. A conical nose angle of 60° is preferred for the cathode although satisfactory results have been obtained with cathode nose angles in the range of 40°–100°. A nozzle structure supplies a shielding gas, e.g., argon, for flow past nose 80 of cathode 40. Additional details of the furnace may be had with reference to the assignee's copending U.S. application Ser. No. 876,741, filed Nov. 14, 1969, in the name of Lawrence W. Scammon, Jr.

In typical operation in an air environment, a main d.c. power supply 90 applies an open circuit voltage of one hundred 35 volts between the cathode 40 and anodes 44. An auxiliary, 300 volt open circuit, starting power supply is connected between cathode 40 and nozzle plate 60, and an arc is initiated with a welding type arc starter in the conical space between cathode nose 80 and the surrounding nozzle. Argon shielding gas blows the arc downwardly from the tip 82 of the cathode 40 to strike the anodes 44. The auxiliary power supply is then disconnected and the current supplied by the main power supply increased to establish an arc that includes a cathode jet 62 and a tail flame 64 that extends from the anodes 44 down the tank 10.

A typical temperature of the cathode jet 62 is about 20,000°F. The temperature at a power of 300 kilowatts (135 volts, 2,250 amps) was measured 30 inches below the graphite anodes 44 with an unshielded thermocouple. The temperature near the tank wall is about 900°F and increases to at least 3,000°F at the center of the tail flame.

In a typical operation, the tank 10 is initially cleaned of all previous run material and each powder feeder (one coupled to each passage 54) is charged with an equal amount of particulate zircon. The electrode system is energized, carrier gas flows are adjusted to the desired values and the powder feeders are turned on at preset feed rates. For processing zircon particles, a suitable carrier gas is nitrogen (80 SCFH in each feed passage 50), and a preferred power feed rate is 300–750 lbs/hr, and most preferably for maximum dissociation of zircon, about 300 to 500 lbs/hr (about 0.6 to 1 kWhr/lb at 300 kilowatts). The cathode jet 62 entrains the particles and sweeps them down through the passage defined by the incandescent sublimating end surfaces of the anodes 44 and along the high enthalpy zone of the tail flame 64. The particles, after passing through the tail flame 64, fall through the cooling zone 66 to the collection chamber 24. A conveyor means may be provided for continuous particle removal.

The zircon particles are rapidly heated (about 0.1 second) to above the dissociation temperature of 1,775°C in the cathode jet and tail flame zones, and are rapidly cooled or quenched (in less than about 0.1 second) from those elevated temperatures to temperatures below the dissociation temperature.

The resultant dissociated zircon particles are of generally spheroidal configuration, and in the form of tiny (generally, 95 percent less than 0.2 microns in diameter) crystallites of monoclinic (determined by X-ray diffraction analysis) zirconia dispersed in a substantially zirconia-free fused amorphous silica mass. There is no evidence that either residual zirconium silicate or crystalline silica remains.

The zirconia phase also contains hafnium which, since it does not interfere with the ceramic properties of zirconia, is usually not separated therefrom. In the dissociation of zircon, the hafnium remains in the zirconia phase and the word "zirconia" will be used to indicate a mixture of zirconium and hafnium oxides. Typically, starting natural zircon ores contain on the order of 1.5 percent hafnia. Since alumina will interfere with the desired ceramic properties of both zircon and zirconia, the starting zircon material is preferably largely free of alumina, a suitable starting ore being Australian zircon. Also, the iron and titania is preferably largely removed from the zircon ore by a high intensity magnetic separator prior to introducing the ore into the furnace.

The size, specific gravity, and silica content of the resultant dissociated zircon particles is a function of the energy input per pound. Table I below shows the effect of increasing the feed rate of starting zircon ore from 300 to 600 lbs/hr, while maintaining an energy input of 300 kw. Silica was measured by a gravimetric procedure.

The increased particle sizes at higher feed rates are throught to be due to the increasing collisions at those rates of molten particles in the plasma, leading to agglomerates of several spherical particles in the product. The change in silica content at the lower feed rates is due to the production of silica vapor so that the product contains less silica than the feed stock. The lower specific gravity of all of the products partially is attributable to the decrease in density brought about by conversion of $ZrSiO_4$ to a mixture of $ZrO_2$ and $SiO_2$, and also to the presence of holes in the spherical particles of dissociated zircon.

In general, for adequate heating of the particle throughout without the use of very high power levels, particles smaller than 1,000 microns are prefered. Toward the larger end of this range, sufficiently rapid quenching may require the injection of cooling gases to the cooling zone 66. A presently preferred starting particle size for zircon ore is 100 to 250 microns. A "medium grade" zircon ore, of which about 90 percent by weight of the particles fall within these limits, is a suitable starting material.

The resulting dissociated zircon has been found to be surprisingly leachable—i.e., the silica is present in the state which is readily separable from the zircon. Removing the silica as hereinafter described renders the particles friable so that they can be crushed more readily to yield sub-micron sized particles, useful in ceramic processes, composed mostly of zirconia. In general, particles having less than 10 percent silica, and preferably 5 percent or less silica remaining are crushable to submicron sizes.

A particular example of a preferred leaching process for separating zirconia from the dissociated zircon is as follows:

An 18.75 g. sample of dissociated zircon is placed in a Teflon beaker and 30 gms. of 50 percent aqueous sodium hydroxide (about two times the stoichiometric amount of sodium hydroxide required to convert all of the silica of the dissociated zircon to sodium silicate) is added. The beaker is placed in a stainless steel container with a heavy, but not sealed, cover and heated at 290°F (at or just below the boiling point of the sodium hydroxide solution) for 2 hours. The half-spent sodium hydroxide is then decanted, and the solid residue of partially leached dissociated zircon is washed with water until the pH of the effluent decreases to 9.0, rinsed with warm 1 percent hydrochoric acid, washed with water until the pH of the effluent rises to 5.5, and dried at 140°C. The acid washing reduced the residual sodium to less than 0.01 percent by weitht.

TABLE I

Weight of Various Size Fractions, Specific Gravity of Total Product, and $SiO_2$ Content of Total Product as Function of Energy Per Pound

| U.S. Standard Mesh Size | | Feed Stock | 1 kWh/lb | 0.73 KWh/lb. | 0.62 kWh/lb. |
|---|---|---|---|---|---|
| | +80 | 2.1 | 22.1 | 47.3 | 63.8 |
| −80, | +100 | 5.3 | 18.8 | 15.8 | 12.7 |
| −100, | +200 | 90.0 | 56.7 | 34.9 | 22.3 |
| −200, | +230 | 2.3 | 1.0 | 0.8 | 0.4 |
| −230, | +325 | 0.2 | 0.7 | 0.7 | 0.4 |
| −325 | | 0.1 | 0.7 | 0.4 | 0.3 |
| Specific Gravity | | 4.68 | 3.78 | 3.78 | 3.80 |
| Percent $SiO_2$ | | 32.6 | 28.8 | 30.6 | 32.0 |

If additional silica removal is desired, the partially leached zircon (either before or after washing and drying) is leached one or more additional times with 50 percent sodium hydroxide in the same amount and at the same heating conditions. The solid residue is washed and dried as before, at least after the final leaching.

The silica content of the dried product is determined by mixing the sample with 1.1. gm. lithium tetraborate (0.9 gm. of sample per 1.1 gm. of tetraborate) and grinding these in a tungsten carbide grinding vial. The ground mixture is fused for 30 minutes at 1,150°C. in a graphite crucible. After fusion, the bead is ground and pressed to form a pellet. This pellet is placed in the sample port of an X-ray fluorescent spectrometer, and the X-ray intensity for silicon is measured during a 100second counting interval. Standards for the X-ray fluorescence procedure covering the range 0 to 10% $SiO_2$ are prepared by mixing appropriate amounts of high purity $ZrO_2$ and silica. A straight line calibration over this concentration range is obtained.

Table 2 below shows the silica remaining after a number of leaches performed on zircon dissociated at the power levels listed. The starting zircon ore was 90 percent by weight 150-250 micron particles. Only the sample at 0.73 kWhr/lb was not washed and dried between each leaching. Only one sample was leached four times, and no additional silica removal was noted.

TABLE 2

| Energy/lb | % Residual Silica | | | |
|---|---|---|---|---|
| | 1st Leach | 2nd Leach | 3rd Leach | 4th Leach |
| 1.0 kWhr/lb | 1.98% | 0.54% | 0.38% | 0.42% |
| 0.73 | — | — | 0.36 | — |
| 0.62 | 1.25 | 0.41 | 0.36 | — |
| 0.50 | 2.84 | — | 2.26 | — |

The results indicate that power levels above 0.6 kWhr/lb are required, for the zircon particles and furnace characteristics described, to reduce silica to below 0.5 percent by weight.

The resultant zirconia particles are friable, crushable porous spheres, and are observed, when photographed at 26,000 X magnification, to consist primarily of tiny crystallites, of which at least about 95 percent have maximum diameters of 0.2 microns or less. These crystallite diameters were confirmed by X-ray Laue photographs. The crystallites were generally of uniform size and purity. The density of the particles containing less than 0.5 percent silica, when freely packed, is less than 3 gms/cc (as compared to the theoretical density of 5.6 gms/cc for zirconia).

For large-scale commercial separation of zirconia, in lieu of employing a fresh sodium hydroxide for each leach, at least the first leach may be conducted with partially spent sodium hydroxide. The zircon particles removed from this leach contain about 5 percent silica, and are hence crushable and useful for many ceramic processes. Further silica can be removed in a second leach with fresh sodium hydroxide, to produce a zirconia product containing less than 1 percent silica and partially spent sodium hydroxide to serve as the first leach for additional dissociated zircon from the furnace. The liquid portion of the first leach can be filtered (e.g., at 175°F) and the filtrate evaporated to produce, as a by-product of the leaching process, sodium silicate ($Na_2SiO_3$—$5H_2O$). On a commercial scale, about 183 lbs of dissociated zircon ($ZrO_2 \cdot SiO_2$) will yield 122 lbs of $ZrO_2$ and 212 lbs of sodium silicate pentahydrate per 160 lbs of 50 percent sodium hydroxide.

In the preferred leaching processes, the fresh sodium hydroxide solution is preferably about 10 to 60 percent by weight sodium hydroxide. Too concentrated hydroxide solutions are viscous and hence do not penetrate the zircon as well as less concentrated solutions. However, since the boiling points of the more concentrated solutions are higher, the leaching can be carried out (at preferred temperatures near the boiling point of the hydroxide) at higher temperatures with the more concentrated solutions (e.g., about 250° to 290°F with 50 percent sodium hydroxide solution). At least the stoichiometric amount of hydroxide required to convert silica to the silicate is preferably present during leaching. 1.5 to 2.5 times this stoichiometric amount is preferred for sodium hydroxide leaching solutions.

The leaching procedures may also be carried out at atmospheric pressures, rendering handling easier, but greater than atmospheric pressures may also be used.

In addition to zircon, other silicate ores may be similarly dissociated and leached, so long as the metal oxide remains stable in fused silica—i.e., neither dissolves, decomposes, nor vaporises. Among the silicate ores to which this process could be applicable are thorite, rhodonite, sillimanite, garnierite, chrysocolla, baunite, calamine and beryl.

Other embodiments will be apparent to one skilled in the art and are within the following claims.

What is claimed is:

1. Dissociated zircon comprising monoclinic zirconia crystallites containing lsss than 1 percent by weight silica and fused amorphous silica, at least about 95 percent of said zirconia crystallites having maximum dimensions of about 0.5 microns.

2. Dissociated zircon according to claim 1 wherein at least about 95 percent of said crystallites have maximum dimensions of about 0.2 microns 3. Dissociated zircon according to claim 1 in the form of particles of generally spheroidal shape.

4. Friable, porous particles formed of a plurality of zirconia crystallites of which at least about 95 percent have maximum dimensions of about 0.2 microns bonded together by fused amorphous silica, said particles containing less than 10 percent by weight silica.

5. Friable particles according to claim 4 containing less than 1 percent silica.

6. Friable particles according to claim 5 containing less than 0.5 percent silica.

7. Friable particles according to claim 4 having a density of less than 3 gms/cc.

8. Zirconia in the form of monoclinic crystallites containing less than 1 percent by weight silica and having a maximum dimension of 0.2 microns.

9. Zirconia according to claim 8 wherein said crystallites contain less than 0.5 percent by weight silica.

* * * * *